United States Patent

Cheng

[11] Patent Number: 5,393,217
[45] Date of Patent: Feb. 28, 1995

[54] NOODLE FORMING DEVICE

[76] Inventor: Chun-Pin Cheng, No. 69, Alley 71, Lane 252, Sec. 2, Chieh Shou Road, Pa Te Hsiang, Taoyuan Hsien, Taiwan, Prov. of China

[21] Appl. No.: 142,804

[22] Filed: Oct. 25, 1993

[51] Int. Cl.$^6$ .............................. A21C 3/04
[52] U.S. Cl. .................... 425/185; 99/348; 366/99; 425/190; 425/205; 425/209; 425/461; 426/504; 426/516
[58] Field of Search ............ 426/504, 517, 516; 425/185, 190, 205, 209, 461, 182; 366/314, 293, 318, 98, 99; 99/348

[56] References Cited

U.S. PATENT DOCUMENTS

| | | | |
|---|---|---|---|
| 3,888,997 | 6/1975 | Guibert | 426/504 |
| 4,391,575 | 7/1983 | Osrow | 425/190 |
| 4,960,601 | 10/1990 | Cummins | 426/504 |
| 5,158,782 | 10/1992 | Hayashi et al. | 425/135 |
| 5,324,185 | 6/1994 | Backus et al. | 425/209 |

Primary Examiner—Khanh Nguyen
Attorney, Agent, or Firm—Poms, Smith, Lande & Rose

[57] ABSTRACT

A noodle forming device includes a dough mixing chamber and an extruding chamber connected to each other, a mixing shaft having mixing blades fixed thereon extending through the mixing chamber, an extruding screw disposed within the extruding chamber and connected to the mixing shaft in such a way to be rotatable about the same rotational axis in unison therewith to extrude mixed dough out of the noodle forming device through an extruding die to form the noodles. A partition plate is removably disposed between the mixing chamber and the extruding chamber to prevent the dough ingredients from entering the extruding chamber before well mixed. Once the dough is well mixed, the partition plate is removed to allow the dough to be expelled into the extruding chamber to be extruded out of the extruding die.

2 Claims, 3 Drawing Sheets

NOODLE FORMING DEVICE

FIELD OF THE INVENTION

The present invention relates generally to a noodle forming device and in particular to one having a partition plate to separate the mixing chamber and extruding chamber to provide a better mixing of the dough.

BACKGROUND OF THE INVENTION

Kitchen appliances for forming dough products, such as noodle, is known, for example U.S. Pat. No. 4,391,575 which discloses a device having a mixing chamber in connection with an extruding chamber with a mixing shaft having mixing blades fixed thereon extending therethrough, an extruding screw being fixed to the mixing shaft for joint rotation therewith. An disadvantage of this device is that since there is no partition between the mixing chamber and the extruding chamber, a portion of the dough ingredients may be expelled into the extruding chamber before well mixed and this leads in a poor quality of the dough product.

It is therefore desirable to provide a noodle forming device of the above-mentioned kind with a partition plate removably disposed between the mixing chamber and the extruding chamber to overcome the above-mentioned problem.

SUMMARY OF THE INVENTION

The principal objective of the present invention is to provide a noodle forming device of the above-mentioned kind with a partition plate removably disposed between the mixing chamber and the extruding chamber so that no dough ingredient is allowed to enter the extruding chamber before well mixed.

To achieve the above objectives, there is provided a noodle forming device having a dough mixing chamber and an extruding chamber connected to each other, a mixing shaft having mixing blades fixed thereon extending through the mixing chamber, an extruding screw disposed within the extruding chamber and connected to the mixing shaft in such a way to be rotatable about the same rotational axis in unison therewith to extrude mixed dough out of the noodle forming device through an extruding die to form the noodles. A partition plate is removably disposed between the mixing chamber and the extruding chamber to prevent the dough ingredients from entering the extruding chamber before well mixed. Once the dough is well mixed, the partition plate is removed to allow the dough to be expelled into the extruding chamber to be extruded out of the extruding die.

BRIEF DESCRIPTION OF THE DRAWING

The present invention will be better understood from the following description of a preferred embodiment of the present invention, with reference to the attached drawings, wherein.

DETAILED DESCRIPTION OF THE PREFERRED EMBODIMENT

Figure 1:
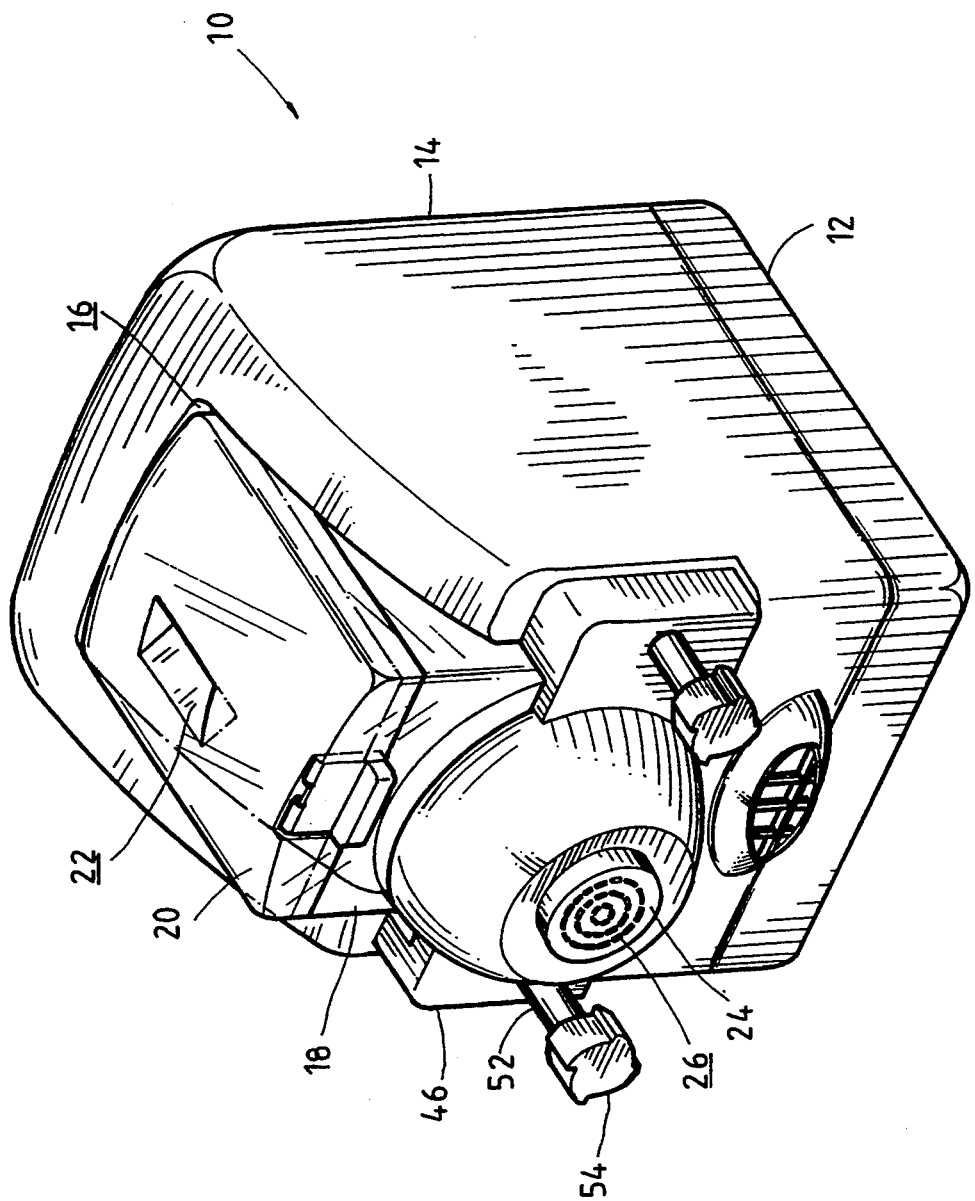
FIG. 1 is a perspective view showing a noodle forming device constructed in accordance with the present invention.

With reference to the drawings and in particular FIG. 1, wherein a noodle forming device constructed in accordance with the present invention, generally designated with the reference numeral 10, is shown, the noodle forming device 10 comprises a base 12 on which a housing 14 is releasably mounted to define therebetween an interior space for receiving therein a driving motor and the corresponding speed reduction means, both not shown in the drawings.

The housing 12 defines a recessed seat 16 into which an open mixing bowl 18 which defines the dough mixing chamber of the noodle forming device 10 is fit. Dough (not shown) is mixed inside the mixing chamber 18 with the ingredients thereof introduced into the mixing chamber 18 from the opening thereof. A cover 20 is removably disposed on the opening of the bowl 18. The cover 20 may be provided with an entry opening 22 for later introducing fluid ingredients into the mixing chamber 18.

An extruding die 24 having a number of holes 26 of desired cross section for forming noodle is mounted in front of the mixing bowl 18 to allow the mixed dough (not shown) to be extruded out therethrough via an extruding means to be further described hereinafter.

Figure 2:
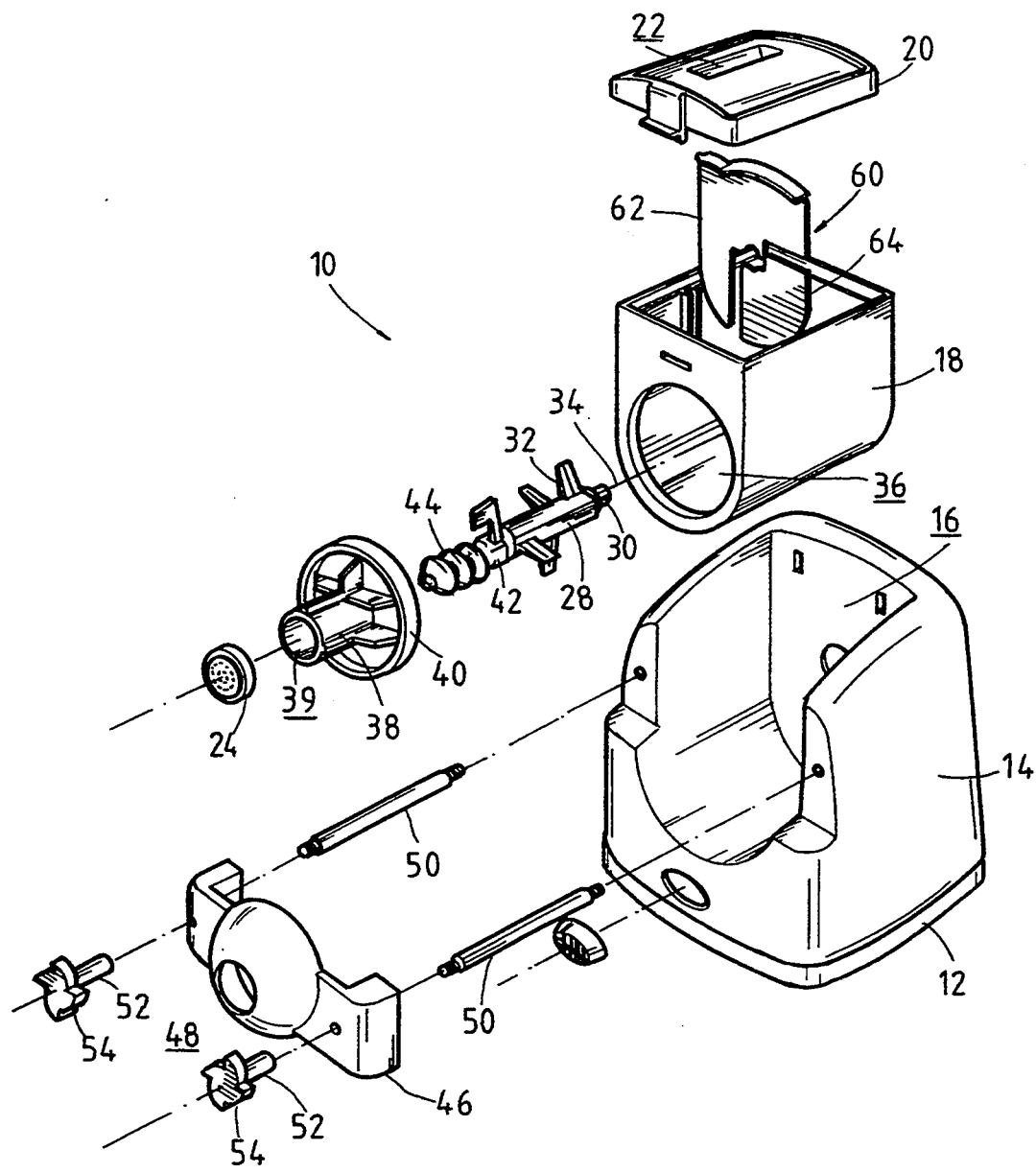
FIG. 2 is an exploded perspective view showing the noodle forming device of the present invention.

With reference to FIG. 2, the noodle forming device 10 comprises a mixing shaft 28 disposed within and extending through the mixing chamber 18 with a rear end 30 thereof drivingly engaged by the speed reduction means disposed inside the interior space of the housing 14 to rotate the mixing shaft 28 about a rotational axis 34 thereof. A number of mixing blades 32 are fixed on the mixing shaft 28 so that when the mixing shaft 28 is rotated within the mixing chamber 18, the dough ingredients are stirred and mixed by the orbital movement of the mixing blades 32 about the rotational axis 34.

The mixing chamber 18 has a front opening 36 to which an extruding chamber 38 is attached with a rear flange 40 thereof so as to be in communication with the mixing chamber 18. The extruding die 24 is disposed on an front opening 39 of the extruding chamber 38.

The mixing shaft 28 has a front end 42 opposite to the rear end 30 thereof, the front end 42 extending partially out of the front opening 36 of the mixing chamber 18. The extruding means comprises an extruding screw 44 formed on the front end 42 of the mixing shaft 28 and extending along the rotational axis 34 into the extruding chamber 38 to be rotatable in unison with the mixing shaft 28 for conveyance of the mixed dough to the extruding die 24 and to apply an extruding force to extrude the dough out of the extruding die 24 to form the noodles.

To provide an easy assembling and/or disassembling, the extruding die 24 and the extruding chamber 38 are releasably secured to the mixing chamber 18 by a securing plate 46 which has a hole 48 corresponding the extruding die 24 to receive and hold the extruding die therein. The securing plate 46 is secured to the housing 14 by a plurality of threaded rods 50 and the corresponding nut members 52. Preferably, each of the nut members 52 has a knob 54 for easy rotation of the nut member 52 by hand.

Partition plate means 60 is removably disposed within the mixing chamber 18 at such a location to separate the mixing chamber 18 and the extruding chamber 38 during the mixing operation. Once the mixing operation of the dough is completed, the partition plate means 60 is removed to allow the well-mixed dough to enter the extruding chamber 38 to be extruded out of the extruding die 24 for the formation of the noodles.

Figure 3:
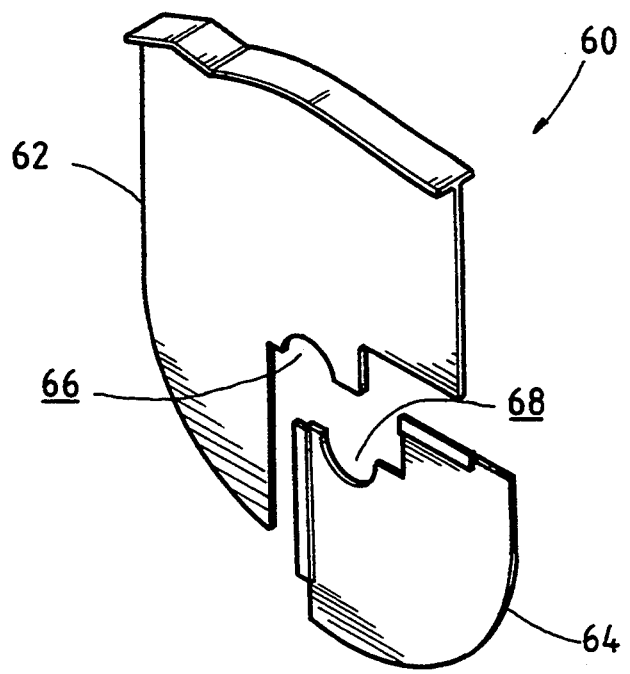
FIG. 3 is a perspective view showing the partition plate used to separate the mixing chamber and the extruding chamber of the noodle forming device of the present invention.

Further referring to FIG. 3, to allow the partition plate means 60 to be inserted into the mixing chamber 18 and surrounding the mixing shaft 28 for the separation of the mixing chamber 18 from the extruding chamber 38, the partition plate 60 is divided into an upper section 62 and a lower section 64, each having a notch 66 or 68 forming a portion of a hole large enough to allow the mixing shaft 28 to rotate therein so that by putting the upper section 62 and the lower section 64 together to form the partition plate 60, the mixing shaft 28 is received within and allowed to rotate in the hole defined by the notches 66 and 68.

With the arrangement of the partition plate 60, the dough ingredients are prevented from entering the extruding chamber 38 before well mixed so as to overcome the poor quality problem that may occur in the conventional device.

It is apparent that although the invention has been described in connection with the preferred embodiment, it is contemplated that those skilled in the art may make changes to the preferred embodiment without departing from the spirit and scope of the invention as defined in the appended claims.

What is claimed is:

1. A noodle forming device comprising a housing defining a recess into which a mixing chamber is fit for receiving therein dough ingredients to be mixed to form a dough, an extruding chamber being in connection with said mixing chamber to allow the dough to be expelled therein, an extruding die mounted on a front opening of said extruding chamber to allow the dough that enters said extruding chamber to be extruded out of said noodle forming device through a plurality of holes thereof, a mixing shaft being disposed within said mixing chamber to be rotatable about a rotational axis thereof with a front end thereof extending into said extruding chamber, mixing blades being fixed on said mixing shaft so that when said mixing shaft rotates, said blades stir and mix the dough ingredients to form the dough, an extruding screw being formed on the front end of said mixing shaft and extending along the rotational axis to enter said extruding chamber so as to be rotatable in unison with said mixing shaft, a partition plate being removably disposed within said mixing chamber at such a location to separate said mixing chamber from said extruding chamber, a hole being formed on said partition plate to allow said mixing shaft to extend therethrough and rotate therein.

2. A noodle forming device as claimed in claim 1, wherein said partition plate comprises an upper section and a lower section each having formed thereon a notch defining a portion of the hole of said partition plate so as to allow said partition plate to be disposed into said mixing chamber with the notches of the upper and lower sections surrounding said mixing shaft for separating said mixing chamber from said extruding chamber.

* * * * *